United States Patent [19]

Stuart

[11] Patent Number: 5,369,954
[45] Date of Patent: Dec. 6, 1994

[54] TURBOFAN ENGINE BYPASS AND EXHAUST SYSTEM

[75] Inventor: Alan R. Stuart, Cincinnati, Ohio

[73] Assignee: General Electric Company, Cincinnati, Ohio

[21] Appl. No.: 65,307

[22] Filed: May 24, 1993

Related U.S. Application Data

[60] Division of Ser. No. 974,033, Nov. 10, 1992, abandoned, which is a continuation-in-part of Ser. No. 688,222, Apr. 22, 1991, abandoned.

[51] Int. Cl.⁵ .................................. F02K 3/02
[52] U.S. Cl. .......................... 60/226.1; 60/262; 60/271; 60/39.31; 239/265.17
[58] Field of Search .............. 60/226.1, 226.3, 262, 60/271, 39.31; 239/265.17

[56] References Cited

U.S. PATENT DOCUMENTS

| | | | |
|---|---|---|---|
| 3,070,131 | 12/1962 | Wheatley | 138/115 |
| 3,806,067 | 4/1974 | Kutney | 244/53 R |
| 4,132,069 | 1/1979 | Adamson et al. | 60/226 R |
| 4,327,548 | 5/1982 | Woodward | 60/226 A |
| 4,449,682 | 5/1984 | Gratzer et al. | 244/130 |
| 4,567,960 | 2/1986 | Johnson et al. | 239/265.17 |
| 4,683,717 | 8/1987 | Naud | 60/226.1 |
| 4,802,629 | 2/1989 | Klees | 239/265.19 |
| 4,930,725 | 6/1990 | Thompson et al. | 244/53 R |
| 5,058,379 | 10/1991 | Lardellier | 60/226.1 |
| 5,097,656 | 3/1992 | Napier | 60/262 |

FOREIGN PATENT DOCUMENTS

| | | | |
|---|---|---|---|
| 1526801 | 10/1970 | Germany | 60/226.1 |
| 888080 | 1/1962 | United Kingdom | 60/262 |
| 2117720 | 10/1985 | United Kingdom | 60/226.3 |

*Primary Examiner*—Richard A. Bertsch
*Assistant Examiner*—Michael I. Kocharov
*Attorney, Agent, or Firm*—Jerome C. Squillaro; John R. Rafter

[57] ABSTRACT

A turbofan engine bypass and exhaust system has a double-hoop configuration in which a fan exhaust passageway comprises shells of a constant circular contour to resolve air pressure induced stresses and increase in bypass passageway area asymmetrically in the horizontal direction without substantially increasing the overall engine height.

5 Claims, 4 Drawing Sheets

TURBOFAN ENGINE BYPASS AND EXHAUST SYSTEM

This application is a division of application Ser. No. 07/974,033, filed Nov. 10, 1992, now abandoned, which is a continuation-in-part of application Ser. No. 07/688,222, filed Apr. 22, 1991, now abandoned, for a Turbofan Engine Bypass and Exhaust System and assigned to the assignee of the present application.

BACKGROUND OF THE INVENTION

1. Field of the Invention

The present invention relates generally to the field of propulsion system aerodynamics and nacelle structures and, more specifically, to an improved bypass and exhaust system for front fan gas turbine engines for aircraft propulsion.

2. Description of the Related Art

In a turbofan gas turbine aircraft engine, a fan exhaust or engine bypass passageway, which terminates in a fan exhaust nozzle, is formed as an annular duct between an inner surface of the engine nacelle which may include a fan nacelle and fan reverser and an outer surface of the core engine cowling. Conventionally, the inner surface of the engine nacelle is centered on the engine center line and is circular in cross-section. The outer surface of the core engine cowling is also centered on the engine center line and is circular in cross-section, but the radius of curvature is smaller than that of the inner surface of the engine nacelle, thus defining the annular duct therebetween.

Increasing the size of the fan of a turbofan engine requires an increase in the size of the exhaust passageway and nozzle, due to the increased flow. Generally, it is desirable to maintain the annular shape of the fan exhaust passageway, particularly in the area of the trans-cowl, cascades reversing mechanisms, as well as the exhaust nozzle, so that operational loads create hoop stresses. Thus, in the past, increases in the size of the fan exhaust passageway and nozzle have resulted in an increase in the overall height of the engine, since in order to maintain an annular shape of the passageway the diameter of the engine must be increased symmetrically.

The motivation for increasing the size of the fan for a given engine is that higher by-pass, larger fan engines, which would require larger fan exhaust passageways and nozzle areas, are generally more efficient. However, the use of a symmetrically increased annular fan exhaust nozzle is limited in two important aspects: (1) since fan engines are mounted under the wing, there is a limit to the overall height of the engine, given that the height of the space between the underside of the wing and the ground is limited; and (2) increasing the overall height of the nozzle eventually creates wing interference drag.

U.S. Pat. No. 3,806,067 describes an asymmetric increase in the exhaust nozzle area achieved by vertically oblating the annular exhaust nozzle near the support pylon. While this vertical oblation results in an advantageous aerodynamic effect (e.g., reduced local static pressure upstream of the pylon which eliminates distortion effects on the fan), the increased overall height leads to the aforementioned problems.

U.S. Pat. No. 5,058,379 granted to Lardellier is directed to a tandem fan engine exhibiting an elliptical shape. A modest increase in bypass airflow is achieved with a lateral expansion of the nacelle. Non-circular pressure vessels such as the Lardellier nacelle which have non constant cross sectional radii have a tendency to distort into more circular shapes. Thick structural duct walls and strut supports are required to maintain the elliptical shape and maintain the airflows from the forward and aft fans separated. Thus, an expected benefit of lateral expansion to achieve greater bypass airflow is diminished by the heavy and bulky structural supports required to implement the design.

There thus exists an unfulfilled need for a lightweight aerodynamic and structurally sound elongated nacelle having an increased exhaust passageway for increased bypass airflow.

SUMMARY OF THE INVENTION

The disclosed improved exhaust system increases the bypass airflow in elongated and substantially circularly shaped lightweight nacelle while beneficially reacting principal stresses as hoop stresses in the substantially circularly shaped, pressure vessel. The structure increases the bypass flow rate of a single forward fan while retaining the same overall nacelle height. The nacelle is constructed of two specially configured C-ducts each having a circular cross section and constant radius of curvature that are joined by a restraining means to maintain a double hoop shape.

An object of the present invention is to increase the area of a fan duct and exhaust nozzle of a turbofan gas turbine aircraft engine without substantially increasing the height of the engine.

Another object of the present invention is to provide a turbofan engine exhaust system capable of enhancing the commonality of a turbofan engine design so that the engine may be installed in a greater number and variety of aircraft.

Another object of the present invention is to prevent radial movement of the inner surface of the engine nacelle to create a larger circular shape by physically tying the ends of the C-ducts together at upper and lower sidewalls by a vertical restraining means such as curved beams in addition to hinges, bumpers, and latches. In an alternative embodiment without vertical restraints a similar result is achieved by shifting the core cowl outwardly in a horizontal direction.

These and other objects of the invention are met by providing a turbofan engine exhaust system which includes an engine nacelle including a fan nacelle and a fan reverser. The engine nacelle is comprised of first and second curvilinear shells carrying air pressure loads in tension hoop stresses. The vertical cross section of each of the shells comprises a partial circle having an arc length greater than 180°. The first and second curvilinear shells can be coupled to each other through an aircraft pylon at the upper bifurcation and directly at the lower bifurcation.

A core engine cowling disposed around a core engine and having fore and aft ends, an inner surface and an outer surface is positioned at least partially within the engine nacelle in coaxial relationship by a fan frame.

A single forward fan can be rotatably mounted in front of the core engine cowling for producing a flow of pressurized air, a first portion of which is fed to an inner flow path through the core engine and a second portion of which is fed through an outer flow path through a fan exhaust passageway formed between the outer surface of the core engine cowling and the inner surface of the engine nacelle. The fan exhaust passageway can terminate at the aft end of the engine nacelle as a fan exhaust nozzle. The outer surface of the core engine cowling has a constant circular cross-sectional shape and a constant radius of curvature centered at a first point which is coincident with a longitudinal axis of the core engine and lies on a vertical plane of symmetry of the turbofan engine. The inner surface of the engine nacelle includes a first portion having a partial circular cross-sectional shape and a constant radius of curvature centered at a second point spaced substantially horizontally from the first point on one side of the plane of symmetry and a second portion having a partial circular cross-sectional shape and a constant radius of curvature centered at a third point spaced horizontally from the first point on an opposite side of the plane of symmetry, Wherein the second and third points are equidistantly spaced from the first point.

Means are provided for resolving vertical and horizontal forces to maintain the circular cross sectional configuration of the nacelle shells. The means for resolving forces between upper and lower bifurcations, for reinforcing and maintaining the substantially circular shape of the left and right C-shaped ducts can comprise a lightweight and curved support beam. The arc length of the circular cross-section of each shell preferably is greater than 180° and less than 225°. The fan cowling covering the curvilinear shells provides a smooth outer surface to avoid aerodynamic drag. The radii of curvature of the first and second portions of the inner surface of the engine nacelle are equal in length.

In an alternative embodiment of the present invention, the outer surface of the core engine cowling has a substantially circular cross-sectional shape and a constant radius of curvature centered at a point spaced horizontally from the first point on one side of the plane of symmetry and a second portion having a partial circular cross-sectional shape and a constant radius of curvature centered at a third point spaced horizontally from the first point on an opposite side of the plane of symmetry, wherein the second and third points are equidistantly spaced from the first point. The inner surface of the engine nacelle includes a first and a second portions having a partial circular cross-sectional shape and a constant radius of curvature whose center is in the same offset vertical planes as the core engine cowling. A nacelle pressure vessel of circular cross sectional shape is preferably secured to the core engine fore and aft for positioning the nacelle relative to the core. In combination, the core cowl and nacelle resolve vertical and horizontal forces exerted by pressurized air on the nacelle pressure vessel to maintain its circular cross sections shape without the use of additional physical restraining means in the vertical direction.

These and other features and advantages of the turbofan engine exhaust system will become more apparent with reference to the following detailed description and drawings.

DETAILED DESCRIPTION OF THE PREFERRED EMBODIMENTS

Figure 1:
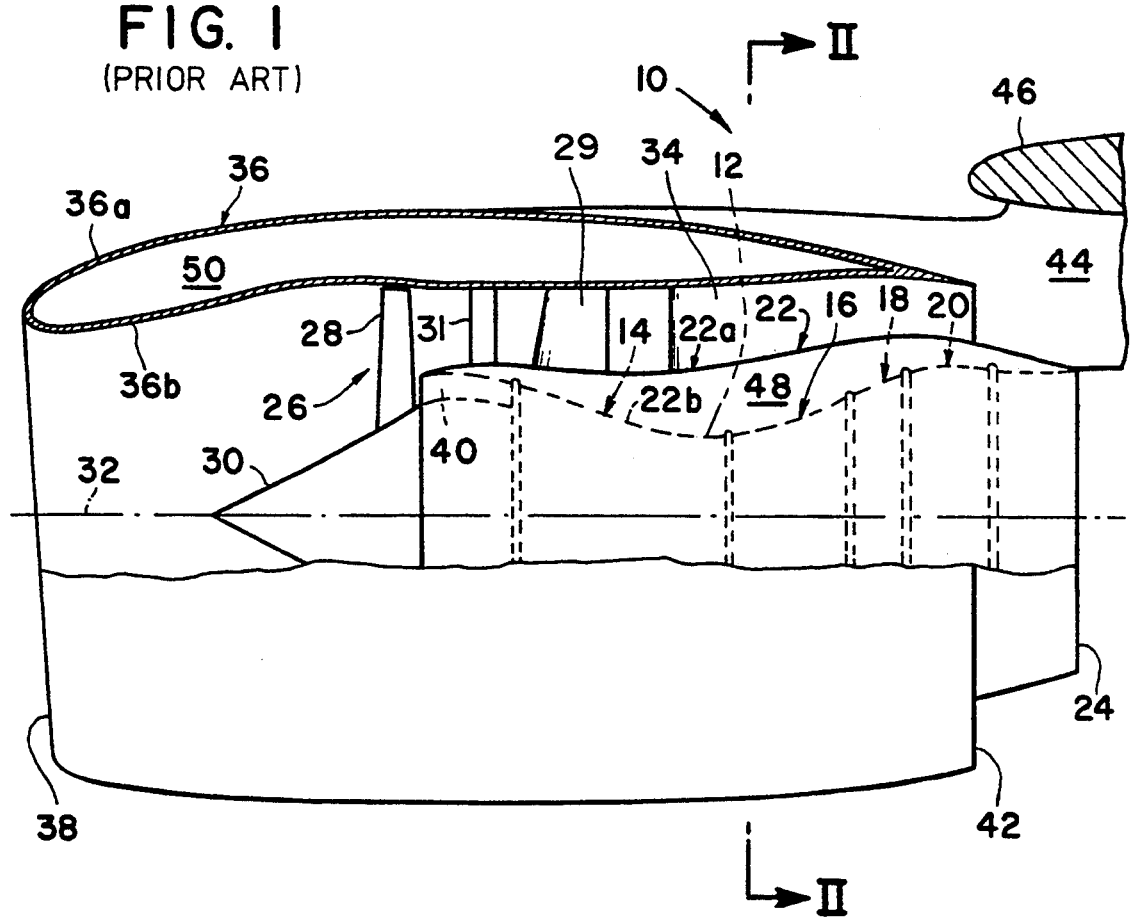
FIG. 1 is an illustration of a side elevational view, with portions removed, of a typical high by-pass, large diameter turbofan engine.

Referring now to the drawings wherein like reference numerals correspond to like elements throughout, FIG. 1 shows in simplified fashion a turbofan engine 10, of the high bypass ratio type, which includes a core engine 12 having a compressor 14, a combustor 16, a gas generator tube 18 for driving the compressor 14, and a power turbine 20 arranged in axially spaced, serial flow relationship.

The core engine 12 is enclosed within a substantially cylindrical core cowling 22 which terminates at its downstream end in an exhaust nozzle 24 through which the combustion products are discharged to produce thrust.

In order to provide additional thrust, a fan 26 is mounted upstream of the core engine 12 and is driven by the power turbine 20 in a known fashion. The fan 26 includes a plurality of fan blades 28 mounted on a rotatable fan rotor 30 for rotation about an engine axis 32, the blades extending radially outwardly across a bypass duct or passageway 34 defined between an outer, substantially cylindrical engine nacelle 36 and the core engine cowling 22. The engine nacelle 36 is structurally supported by a fan frame that includes radially disposed struts 29 which are immediately downstream of the fan outlet guide vanes 31. Air drawn through an inlet opening 38 at the upstream end of the engine nacelle 36 is accelerated by the fan 26, after which a portion of the air passes through to the core engine 12 through an inner passageway 40 to support combustion in the core engine 12. The remainder of the air flows through the bypass passageway 34 from which it is normally discharged in the axial downstream direction through an outlet opening which serves as the fan exhaust nozzle 42. A pylon 44 mounts the engine to an underside of a wing 46 in conventional fashion.

The core engine cowling 22 has an outer surface 22a and an inner surface 22b which together define a space 48 therebetween. The engine nacelle 36 has an outer surface 36a and an inner surface 36b which together define a space 50 therebetween. The fore ends of the inner surface 36b and the outer surface 36a converge to form the inlet opening 38.

Figure 2:
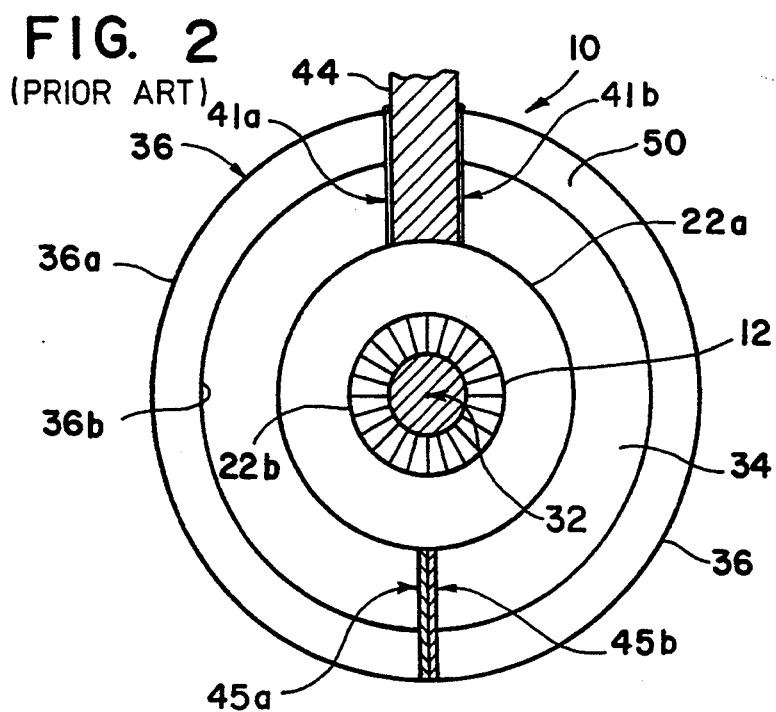
FIG. 2 is an illustration of an enlarged sectional view taken along line II—II of FIG. 1.

Conventionally, as shown in FIG. 2, the nozzle 42 and passageway 34 have annular cross-sectional shapes. The engine axis 32, corresponding to the core engine axis, represents the center point of the radius of curvature for the outer surface 22a of the core engine cowling 22, as well as the center point of the radius of curvature for the inner surface 36b of the engine nacelle 36. The annular passageway 34 is comprised of two "C" ducts that are combined to form an expanded nacelle 36. Each C-duct has a substantially circular cross-section of no more than 180°. The C-ducts are joined by upper sidewalls 41a and 41b which run parallel to the pylon 44 to provide an upper bifurcation and lower sidewalls 45a and 45b which provide a lower bifurcation. The upper sidewalls 41a and 41b are hinged at the top to the pylon, while the lower sidewalls 45a and 45b are latched together. To provide access to the core engine, the lower sidewalls 45a and 45b are un-latched and the C-ducts pivot upwardly away from the core engine in conventional fashion.

Figure 3:
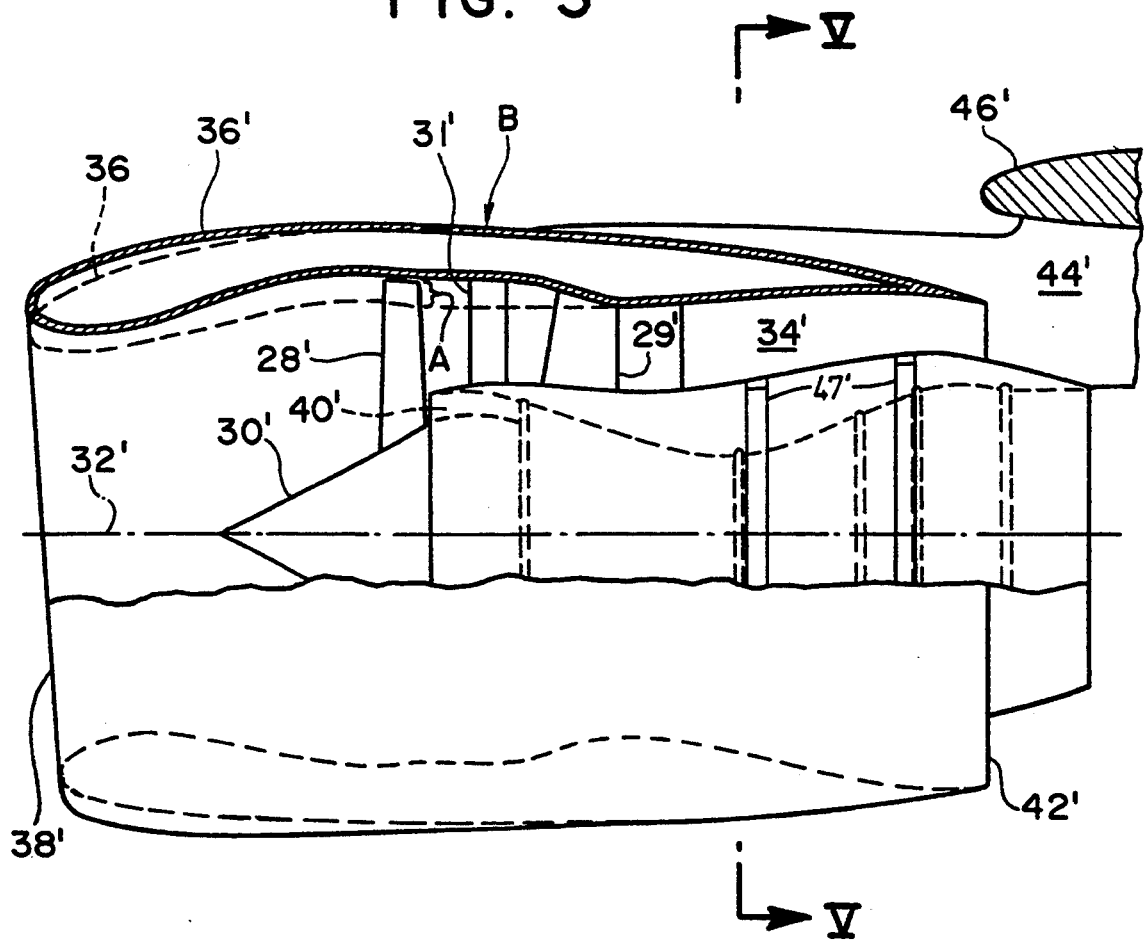
FIG. 3 is an illustration of a side elevation view, with portions removed, of a high bypass, large diameter turbofan engine according to the present invention.
Figure 4:
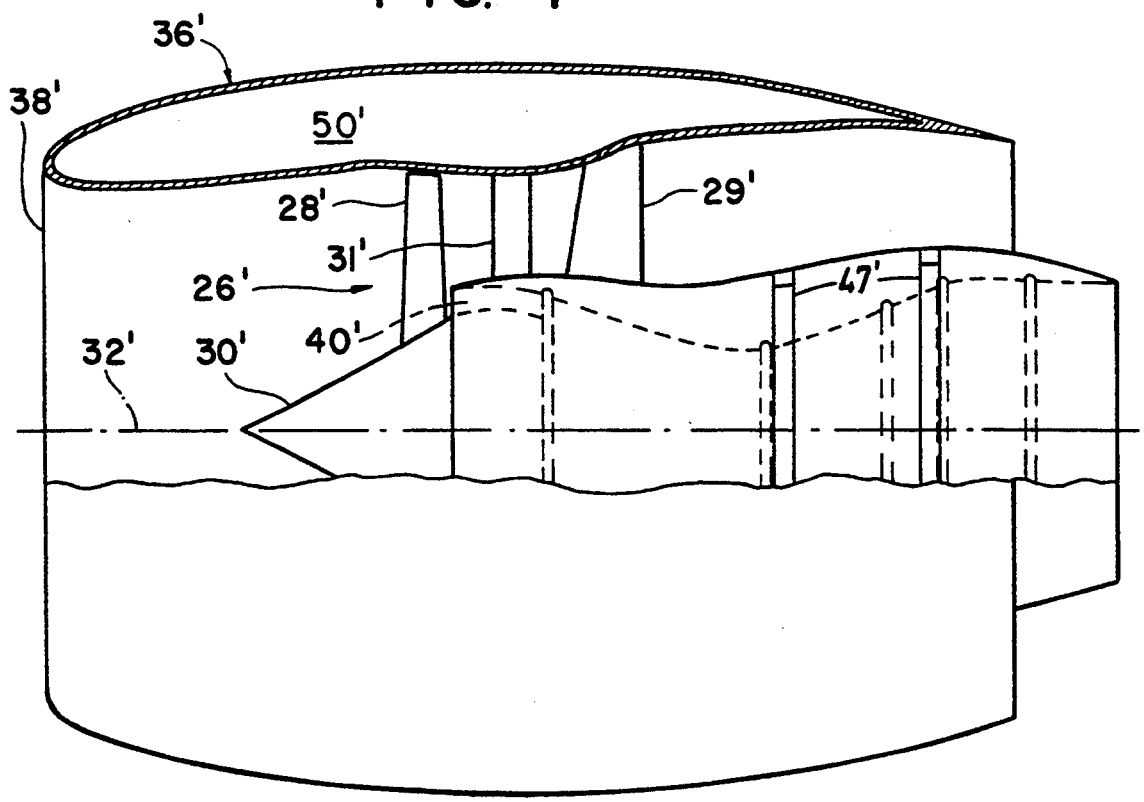
FIG. 4 is an illustration of a plan view, with portions removed, of the high by-pass, large diameter turbofan engine of FIG. 3.
Figure 5:
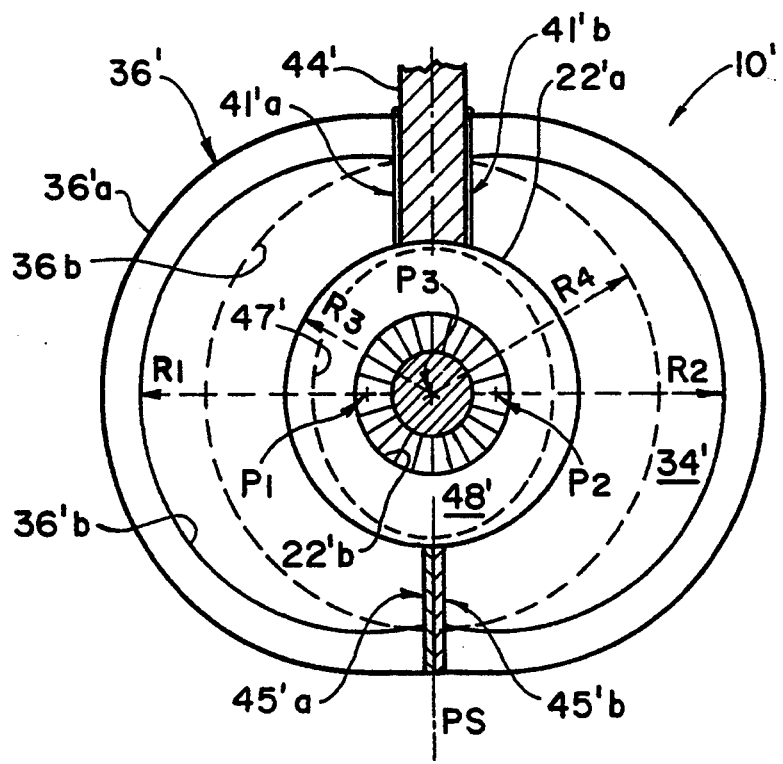
FIG. 5 is an illustration of an enlarged sectional view taken along lines V—V of FIG. 3.

Referring now to FIGS. 3–5, an illustration is shown of a turbofan engine 10' incorporating the present invention to provide a higher bypass ratio engine having an enlarged fan 28'. The fan 28' length, compared to that of the turbofan engine 10 of FIGS. 1 and 2, is increased. Although the overall height of the engine 10' has not increased compared to the engine 10, turbofan blades 28' have a length greater than that of the blades 28 by an amount "A". While the engine nacelle 36' has been contoured adjacent the blades to accommodate their additional length, the nacelle height and height of the inlet opening of the engine nacelle has not been increased. Nonetheless, the inlet area has been increased to accommodate this increase in length. The engine nacelle 36' is contoured to form an inlet opening 38' which has a larger area than the opening 38 of the turbofan engine 10, without increasing the overall height of the engine. The inlet 38' of the enlarged engine 10' comprises a slightly elliptical shape from the front view, while the exhaust nozzle 42' has a more pronounced double-hoop shape similar to the passageway 34' shown in FIG. 5. Phantom lines in FIG. 3 illustrate the position of the engine nacelle 36 from the smaller fan engine 10 of FIG. 1. Since FIG. 3 is a side elevational view, it can be seen that the overall height of the engine 10' is not increased even though the length of blade 28' has increased by the amount A. On the other hand, the plan view of FIG. 4 shows that the width of the engine 10' has increased to reflect an increased width of the fan exhaust passageway 34' and nozzle 42'.

Referring to FIG. 5, an increased area of the bypass flow passageway 34' is illustrated as a region between the inner surface 36'b of the engine nacelle 36' and the dotted phantom line showing where the inner surface 36b of the engine nacelle 36 would have been for the engine 10 of FIG. 1.

The nacelle 36' comprises two curvilinear shells each of constant radius fixedly joined in an unified structure. The shape of the nacelle bypass passageway 34' is based on a double-hoop C-duct configuration wherein each shell has a circular cross section of an arc length greater than 180° and less than 225°. In the illustrated configuration the inner surface 36'b of the engine nacelle 36' has first and second portions corresponding to left and fight-hand C-ducts, one being disposed on each side of the vertical plane of symmetry PS. The left-hand C-duct illustrated in FIG. 5 has an outer wall defined by the inner surface 36'b of the engine nacelle 36', having a radius of curvature $R_1$ and a pivot center of $P_1$, while the fight-hand C-duct has an outer wall defined by the inner surface 36'b of the engine nacelle 36' having a radius of curvature $R_2$ and a pivot center $P_2$. While the length of $R_1$ is equal to the length of $R_2$, their respective pivot centers $P_1$ and $P_2$ are spaced horizontally outwardly on opposite sides of PS. On the other hand, the inner wall of both the left and right-hand portions of the passageway 34' corresponds to the outer surface of the core engine cowling 22', which has a radius of curvature $R_3$ and a pivot center $P_3$ which is coincident with the engine axis 32. Radius $R_4$ has the same pivot center $P_3$ as radius $R_3$ and represents the radius of curvature for the inner surface 36b of the engine nacelle 36 of the engine 10. The double-hoop shape of the passageway 34' begins approximately in the vicinity of the struts 29'.

At the intersection between the curvilinear shells and the pylon 44' and lower bifurcations 45', an obtuse angle is formed within the fan exhaust passageway. The outer surface of the engine nacelle 36' a provides a smooth outer surface to avoid aerodynamic drag.

Spacing the pivot centers $P_1$ and $P_2$ outwardly creates a non-annular exhaust passageway and nozzle which can create loads tending to force the ends of the C-ducts at the pylon 44' and at the lower bifurcation 45' in opposite directions, thus creating a tendency towards reforming or circularizing the annularly-shaped duct. In order to counteract this tendency, restraining means can be provided to transfer the loads from the upper sidewalls 41'a and 41'b, collectively the "upper bifurcation", to the sidewalls 45'a and 45'b, collectively the "lower bifurcation", thus maintaining the double-hoop shape illustrated in FIG. 5. Any suitable restraining means can be used, such as a lightweight and curved support beam 47' (illustrated in FIGS. 3–5) which is connected by any suitable means such as the pylon sidewalls to the upper bifurcation and the lower bifurcation to transfer the load from the upper bifurcation to the lower bifurcation. A plurality of beams 47' may be provided at axially spaced intervals along the length of the space 48'. Each beam 47' has left and right segments disposed respectively in the left and right-hand sides of PS. In effect, the ends of the C-ducts are tied together to prevent radial movement of the ends. Any suitable beams or structural reinforcements may be employed to tie the top and bottom of the C-ducts together in the vicinity of the pylon 44' and the lower bifurcation 45'. Depending on the exact engine configuration, the beams can be longitudinal or circumferential, and may pass through or around the core engine 12'.

Referring to FIGS. 3 and 4, an asymmetric fan frame is used to accommodate the radial offset in the transcowl area, such that struts 29' gradually increase in length to a maximum at the horizontal positions (3 o'clock and 9 o'clock) and decrease to a minimum at the vertical positions (12 o'clock and 6 o'clock). The elongated struts 29' may be twisted to maintain the required circumferential migrations of the fan air flow.

The double-hoop shape of the passageway 34' begins approximately in the vicinity of the struts 29'. Also, the substantially annular space 50' has an enlarged volume which can be used to accommodate a fan case mounted accessory gearbox (not shown) on the side of the engine.

Figure 6:
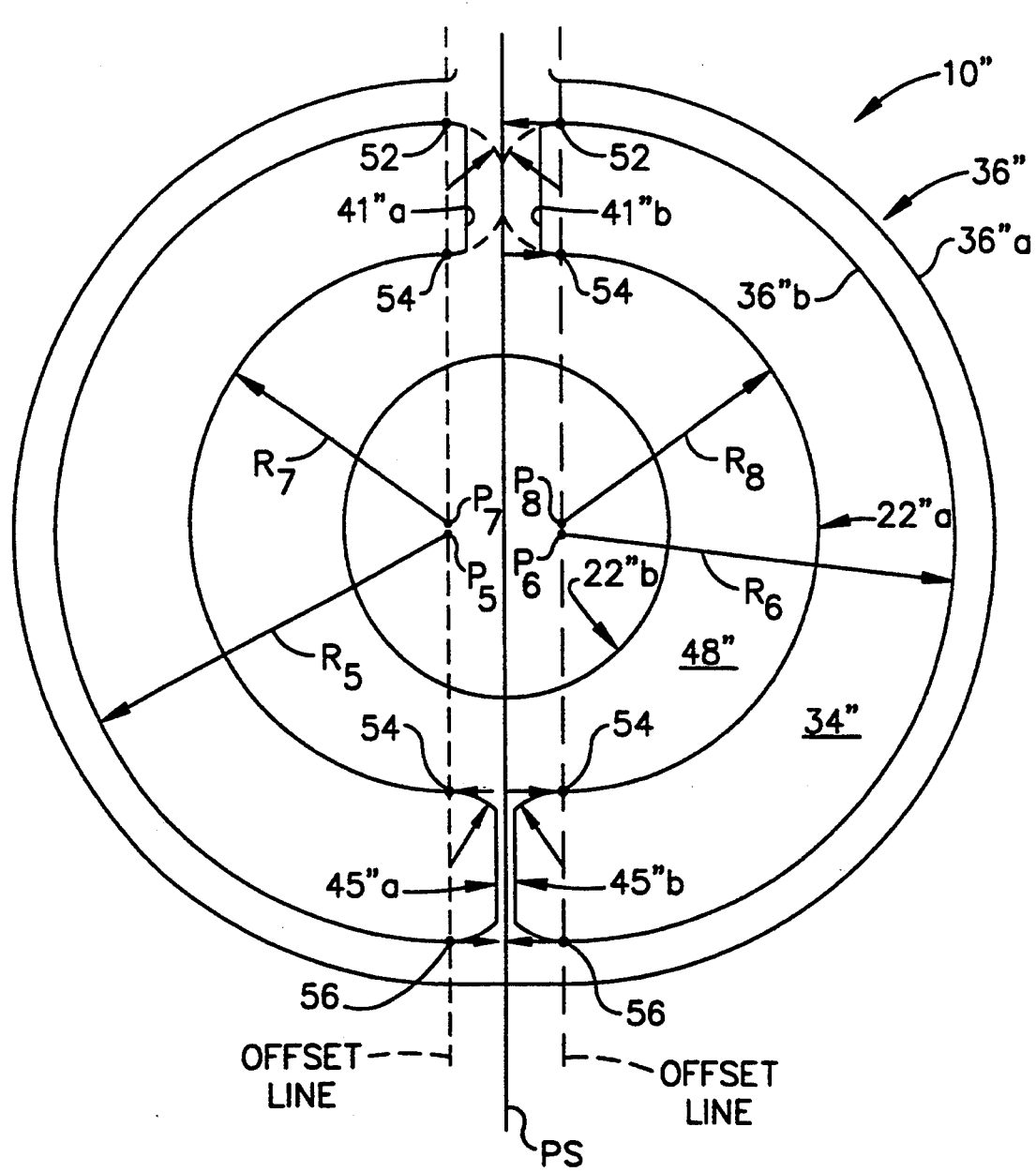
FIG. 6 is an illustration of an alternative embodiment of the present invention to that of FIGS. 3-5.

In FIG. 6, an alternative embodiment of the present invention attains the double hoop shape wherein two partial circular cross sectional segments which are separated equidistantly apart, however, without the utilization of physical means, such as the vertical restraining devices identified as curved beam 47' illustrated in FIGS. 3–5.

The shape of the passageway 34" is based on a double-hoop configuration in which the inner surface 36"b of the engine nacelle 36" has first and second portions corresponding to left and fight-hand C-ducts, one being disposed on each side of the vertical plane of symmetry PS. The left- and right-hand C-ducts can contact each other along upper sidewalls 41"a and 41"b, respectively, and along bumper surfaces 45"a and 45"b. The left-hand C-duct illustrated in FIG. 6 has an outer wall defined by the inner surface 36"b of the engine nacelle 36", having a radius of curvature $R_5$ and a center of $P_5$, while the right-hand C-duct has an outer wall defined by the inner surface 36'b of the engine nacelle 36' having a radius of curvature $R_6$ and a center $P_6$. Centers $P_5$ and $P_6$ are spaced horizontally outwardly on opposite sides of PS. On the other hand, the inner wall of both the left and fight-hand portions of the passageway 34" corresponds to the outer surface of the core engine cowling 22", which has a left- and fight-hand C-duct radius of curvature, $R_7$ and $R_8$, respectively, with centers $P_7$ and $P_8$. Centers, $P_5$ and $P_7$, and $P_6$ and $P_8$, respectively, lie in the same offset vertical planes.

As depicted in FIG. 6, the core cowl 22"a is shifted outward in the horizontal direction whereby, the tendency of the fan duct (pressure vessel) 34" to return to a larger circular configuration is restrained only by forces in a horizontal plane at the hinges 52, bumpers 54, and latches 56 and the desirable use of a thin walled pressure vessel system is maintained.

Numerous modifications and adaptations of the present invention will be apparent to those so skilled in the an and thus, it is intended by the following claims to cover all such modifications and adaptations which fall within the true spirit and scope of the invention.

What is claimed is:

1. A turbofan engine exhaust system comprising:
   an engine nacelle including first and second curvilinear shells of constant radius of curvature for carrying air pressure loads in tension hoop stresses, and the vertical cross section of each of said shells having an arc length greater than 180° of circumference, wherein, said first and second curvilinear shells are faced with leading edge bumpers and are coupled to the aircraft pylon at upper and lower bifurcations;
   a core engine cowling disposed around a core engine, a first outer surface portion of the core engine cowling having a substantially circular cross-sectional shape and a constant radius of curvature centered about a second point spaced horizontally from a first point on one side of the plane of symmetry and a second outer surface portion having a partial circular cross-sectional shape and a radius of curvature centered at a third point spaced horizontally from the first point on an opposite side of the plane of symmetry, wherein the second and third points are equidistantly spaced from the first point, and
   an inner surface of the engine nacelle including first and second portions having a partial circular cross-sectional shape and a radius of curvature whose center is in the same offset vertical planes as the core engine cowling and
   means for coupling the core engine cowling to the engine nacelle at the upper and lower bifurcations to resolve air pressure induced forces and maintain the nacelle shape in a substantially circular shape without the use of additional physical restraining means for reacting forces in the vertical direction.

2. A turbofan engine as recited in claim 1, wherein the shells are fixedly joined by hinges, latches, and bumpers aligned on a hemispherical axis separating the ducts.

3. A turbofan engine exhaust system comprising:
   an engine nacelle comprising first and second shells of constant radius for carrying air pressure loads in tension hoop stresses, said shell having circular cross section of an arc length greater than 180° wherein, said first and second curvilinear shells are coupled to each other through an aircraft pylon at the upper and lower bifurcations;
   a core engine cowling disposed around a core engine and having fore and aft ends, an inner surface and an outer surface, and bring positioned at least partially within the engine nacelle by a fan frame; and said outer surface of the core engine cowling including a first portion having a substantially circular cross-sectional shape and a constant radius of curvature centered at a second point spaced horizontally from a first point on one side of the plane of symmetry and a second portion having a partial circular cross-sectional shape and a radius of curvature centered about a third point spaced horizontally from the first point on an opposite side of the plane of symmetry, wherein the second and third points are equidistantly spaced from the first point,
   an inner surface of the engine nacelle including first and second portions having a partial circular cross-sectional shape and a radius of curvature offset from the first point in parallel, non-identical vertical planes as the core engine cowling and at a distance farther removed.

4. A turbofan engine as recited in claim 3, further comprising restraining means coupled between the upper and lower bifurcations, for reinforcing and maintaining the substantially circular shape of the shells 5. A turbofan engine as recited in claim 4, wherein said restraining means resolves vertical forces exerted on the shells and opposes the outward expansion of the shells at said upper and lower bifurcations.

* * * * *